United States Patent
Sah et al.

(10) Patent No.: US 8,182,390 B2
(45) Date of Patent: May 22, 2012

(54) METHOD FOR CONTROLLING NEUTRAL MODES IN A MULTI-MODE HYBRID TRANSMISSION

(75) Inventors: Jy-Jen F. Sah, West Bloomfield, MI (US); Lawrence A. Kaminsky, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 411 days.

(21) Appl. No.: 12/604,607

(22) Filed: Oct. 23, 2009

(65) Prior Publication Data

US 2011/0098152 A1 Apr. 28, 2011

(51) Int. Cl.
*B60K 1/02* (2006.01)
*G06F 17/00* (2006.01)

(52) U.S. Cl. ............................... 477/3; 701/51
(58) Field of Classification Search ........ 477/3; 701/51, 701/54
See application file for complete search history.

(56) References Cited

U.S. PATENT DOCUMENTS

| | | | |
|---|---|---|---|
| 6,551,208 B1 | 4/2003 | Holmes et al. | |
| 7,010,406 B2 | 3/2006 | Sah et al. | |
| 7,130,734 B2 | 10/2006 | Sah et al. | |
| 7,217,211 B2 | 5/2007 | Klemen et al. | |
| 7,324,885 B2 | 1/2008 | Sah et al. | |
| 7,356,398 B2 | 4/2008 | Steinmetz et al. | |
| 7,670,253 B2* | 3/2010 | Sah | 477/3 |
| 2007/0276569 A1 | 11/2007 | Sah et al. | |
| 2007/0284176 A1 | 12/2007 | Sah et al. | |
| 2008/0234097 A1 | 9/2008 | Sah | |

* cited by examiner

*Primary Examiner* — Dirk Wright
(74) *Attorney, Agent, or Firm* — Quinn Law Group, PLLC

(57) ABSTRACT

A method of clutch control includes engaging a first holding clutch to place the transmission in a first neutral mode and predicting a first EVT mode. The method begins tracking a first output clutch and predicts a second EVT mode. Tracking the first output clutch ends and tracking a second holding clutch begins. The method engages the second holding clutch to place the transmission in a second neutral mode, ending tracking of the second holding clutch. The first holding clutch is disengaged to place the transmission in a third neutral mode and the method begins tracking a second output clutch. Engaging the second output clutch places the transmission in the second EVT mode and ends tracking of the second output clutch. The engine may be placed into a speed control mode and the transmission placed into a full hydraulic neutral mode.

8 Claims, 4 Drawing Sheets

| Transmission State | C4 | C3 | C2 | C1 |
|---|---|---|---|---|
| Neutral1 | Off | Off | Off | Off |
| ETC1 | Off | Off | Off | ON |
| ETC2 | Off | Off | ON | Off |
| ETC12 | Off | Off | ON | ON |
| Neutral2 | Off | ON | Off | Off |
| EVT1 | Off | ON | Off | ON |
| EVT4 | Off | ON | ON | Off |
| Park | Off | ON | ON | ON |
| Neutral3 | ON | Off | Off | Off |
| EVT2 | ON | Off | Off | ON |
| EVT3 | ON | Off | ON | Off |
| FG2 | ON | Off | ON | ON |
| Neutral4 | ON | ON | Off | Off |
| FG1 | ON | ON | Off | ON |
| FG3 | ON | ON | ON | Off |

US 8,182,390 B2

METHOD FOR CONTROLLING NEUTRAL MODES IN A MULTI-MODE HYBRID TRANSMISSION

TECHNICAL FIELD

The present invention relates generally to hybrid powertrains for motorized vehicles, and hydraulic control thereof.

BACKGROUND OF THE INVENTION

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston type internal combustion engine (ICE).

Hybrid vehicles utilize alternative power sources to propel the vehicle, minimizing reliance on the engine for power. A hybrid electric vehicle (HEV), for example, incorporates both electric energy and chemical energy, and converts the same into mechanical power to propel the vehicle and power the vehicle systems. The HEV generally employs one or more electric machines that operate individually or in concert with an internal combustion engine to propel the vehicle. Since hybrid vehicles can derive their power from sources other than the engine, engines in hybrid vehicles may be turned off while the vehicle is stopped or is being propelled by the alternative power source(s).

Parallel hybrid architectures are generally characterized by an internal combustion engine and one or more electric motor/generator assemblies, all of which have a direct mechanical coupling to the transmission. Parallel hybrid designs utilize combined electric motor/generators, which provide traction and may replace both the conventional starter motor and alternator. The motor/generators are electrically connected to an energy storage device (ESD). The energy storage device may be a chemical battery. A control unit is employed for regulating the electrical power interchange between the energy storage device and motor/generators, as well as the electrical power interchange between the first and second motor/generators.

Electrically-variable transmissions (EVT) provide for continuously variable speed ratios by combining features from both series and parallel hybrid powertrain architectures, and also elements of traditional, non-hybrid transmissions. EVTs may be designed to operate in both fixed-gear (FG) modes and EVT modes. When operating in a fixed-gear mode, the rotational speed of the transmission output member is a fixed ratio of the rotational speed of the input member from the engine, depending upon the selected arrangement of the differential gearing subsets. EVTs may also be configured for engine operation that is mechanically independent from the final drive.

The EVT can utilize the differential gearing to send a fraction of its transmitted power through the electric motor/generator(s) and the remainder of its power through another, parallel path that is mechanical. One form of differential gearing used is the epicyclic planetary gear arrangement. However, it is possible to design a power split transmission without planetary gears, for example, as by using bevel gears or other differential gearing.

Hydraulically-actuated torque-transmitting mechanisms, such as clutches and brakes, are selectively engageable to selectively activate the gear elements for establishing different forward and reverse speed ratios and modes between the transmission input and output shafts. The term "clutch" is used hereinafter to refer generally to torque transmitting mechanisms, including, without limitation, devices commonly referred to as clutches and brakes. The "speed ratio" is generally defined as the transmission input speed divided by the transmission output speed. Thus, a low gear range has a high speed ratio, and a high gear range has a relatively lower speed ratio. Because EVTs are not limited to single-speed gear ratios, the different operating states may be referred to as ranges or modes.

SUMMARY OF THE DISCLOSURE

A method of hydraulic clutch control for a vehicle having a multi-mode hybrid transmission with first and second holding clutches and first and second output clutches is provided. The method includes engaging the first holding clutch to place the transmission in a first neutral mode and predicting a first electronically variable transmission (EVT) mode. The method begins tracking the first output clutch and predicts a second EVT mode. Tracking of the first output clutch ends and tracking of the second holding clutch begins. The method engages the second holding clutch to place the transmission in a second neutral mode, which ends tracking of the second holding clutch. The first holding clutch is disengaged to place the transmission in a third neutral mode and the method begins tracking the second output clutch. Engaging the second output clutch places the transmission in the second EVT mode, which ends tracking of the second output clutch.

The transmission may be operatively connected to an internal combustion engine, and the engine placed in a torque control mode while the transmission is in the first neutral mode. Predicting the first and second EVT modes includes monitoring one of a vehicle speed, an engine speed and a driver torque request. The engine may be placed into a speed control mode and the transmission placed into a full hydraulic neutral mode. None of the clutches is engaged during full hydraulic neutral mode.

The above features and advantages, and other features and advantages of the present invention will be readily apparent from the following detailed description of the preferred embodiments and other modes for carrying out the present invention when taken in connection with the accompanying drawings and appended claims.

DESCRIPTION OF PREFERRED EMBODIMENTS

Figure 1:
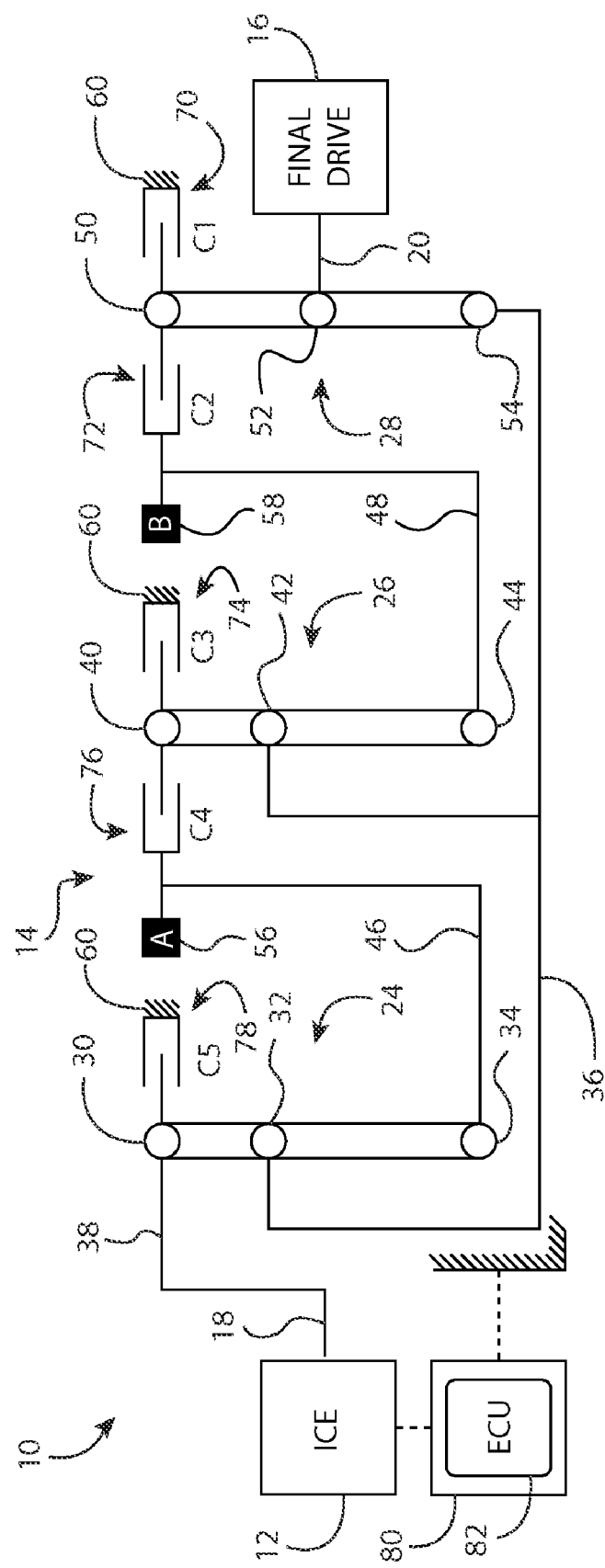
FIG. 1 is a schematic lever diagram illustration of an exemplary vehicle powertrain with a multi-mode, electrically-variable hybrid transmission in accordance with the present invention.

The claimed invention is described herein in the context of a hybrid-type vehicular powertrain having a multi-mode, multi-speed, electrically-variable, hybrid transmission, which is intended solely to offer a representative application by which the present invention may be incorporated and practiced. The claimed invention is not limited to the particular powertrain arrangement shown in the drawings. Furthermore, the hybrid powertrain illustrated herein has been greatly simplified, it being understood that further information regarding the standard operation of a hybrid powertrain, or a hybrid-type vehicle will be recognized by those having ordinary skill in the art.

Referring to the drawings, wherein like reference numbers refer to like components throughout the several views, there is shown in FIG. 1 a lever diagram depiction of an exemplary vehicle powertrain system, designated generally as 10. The powertrain 10 includes a restartable engine 12 that is selectively drivingly connected to, or in power flow communication with, a final drive system 16 via a multi-mode, electrically-variable hybrid-type power transmission 14.

A lever diagram is a schematic representation of the components of a mechanical device such as an automatic transmission. Each individual lever represents a planetary gearset, wherein the three basic mechanical components of the planetary gear are each represented by a node. Therefore, a single lever contains three nodes: one for the sun gear member, one for the planet gear carrier member, and one for the ring gear member. The relative length between the nodes of each lever may be used to represent the ring-to-sun ratio of each respective gearset. These lever ratios, in turn, are used to vary the gear ratios of the transmission in order to achieve appropriate ratios and ratio progression. Mechanical couplings or interconnections between the nodes of the various planetary gear sets and other components of the transmission (such as motor/generators) are illustrated by thin, horizontal lines. Torque transmitting devices such as clutches and brakes are presented as interleaved fingers. If the device is a brake, one set of the fingers is grounded.

The transmission 14 is designed to receive at least a portion of its driving power from the engine 12, through an input member 18, for example. The transmission input member 18, which is in the nature of a shaft, may be the engine output shaft (also referred to as a "crankshaft"). Alternatively, a transient torque damper (not shown) may be implemented between the engine 12 and the input member 18 of the transmission 14. The engine 12 transfers power to the transmission 14, which distributes torque through a transmission output member or shaft 20 to drive the final drive system 16, and thereby propel the vehicle (not shown).

In the embodiment depicted in FIG. 1, the engine 12 may be any of numerous forms of petroleum-fueled prime movers, such as the reciprocating-piston type internal combustion engines, which includes spark-ignited gasoline engines and compression-ignited diesel engines. The engine 12 is readily adaptable to provide its available power to the transmission 14 at a range of operating speeds, for example, from idle, at or near 600 revolutions per minute (RPM), to over 6,000 RPM. Irrespective of the means by which the engine 12 is connected to the transmission 14, the input member 18 is connected to a differential gear set encased within the transmission 14, as explained in more detail herein.

Referring still to FIG. 1, the hybrid transmission 14 utilizes one or more differential gear arrangements, preferably in the nature of three interconnected epicyclic planetary gear sets, designated generally at 24, 26 and 28, respectively. Each gear set includes three gear members: a first, second and third member. In referring to the first, second and third gear sets in this description and in the claims, these sets may be counted "first" to "third" in any order in the drawings (e.g., left to right, right to left, etc.). Likewise, in referring to the first, second and third members of each gear set in this description and in the claims, these members may be counted or identified as "first" to "third" in any order in the drawings (e.g., top to bottom, bottom to top, etc.) for each gear set.

The first planetary gear set 24 has three gear members: a first, second and third member 30, 32 and 34; respectively. In a preferred embodiment, the first member 30 includes of an outer gear member (which may be referred to as a "ring gear") that circumscribes the third member 34, which may include of an inner gear member (which may be referred to as a "sun gear"). In this instance, the second member 32 acts as a planet carrier member. That is, a plurality of planetary gear members (which may be referred to as "pinion gears") are rotatably mounted on the second member, planet carrier 32. Each planetary gear member is meshingly engaged with both the first member, ring gear 30 and the third member, sun gear 34.

The second planetary gear set 26 also has three gear members: a first, second and third member 40, 42 and 44, respectively. In the preferred embodiment discussed above with respect to the first planetary gear set 24, the first member 40 of the second planetary gear set 26 is an outer "ring" gear member that circumscribes the third member 44, which is an inner "sun" gear member. The ring gear member 40 is coaxially aligned and rotatable with respect to the sun gear member 44. A plurality of planetary gear members are rotatably mounted on the second member 42, which acts as a planet carrier member, such that each planetary gear meshingly engages both the ring gear member 40 and the sun gear member 44.

The third planetary gear set 28, similar to the first and second gear sets 24, 26, also has first, second and third members 50, 52 and 54, respectively. In this arrangement, however, the second member 52, shown on the middle node of the lever for the third planetary gear set 28, is the outer "ring" gear. The ring gear (second member 52) is coaxially aligned and rotatable with respect to the sun gear, third member 54. The first member 50 is the planet carrier in this particular gear set, and is shown on the top node. As such, a plurality of planetary or pinion gear members are rotatably mounted on the planet carrier, first member 50. Each of the pinion gear members is aligned to meshingly engage either the ring gear (second member 52) and an adjacent pinion gear member or the sun gear (third member 54) and an adjacent pinion gear member.

In one embodiment on the transmission 14, the first and second planetary gear sets 24, 26 each are simple planetary gear sets, whereas the third planetary gear set 28 is a compound planetary gear set. However, each of the planet carrier members described above can be either a single-pinion (simple) carrier assembly or a double-pinion (compound) carrier assembly. Embodiments with long pinions are also possible.

The first, second and third planetary gear sets 24, 26, 28 are compounded in that the second member 32 of the first planetary gear set 24 is conjoined with (i.e., continuously connected to) the second member 42 of the second planetary gear set 26 and the third member 54 of the third planetary gear set 28, as by a central shaft 36. As such, these three gear members 32, 42, 54 are rigidly attached for common rotation.

The engine 12 is continuously connected to the first member 30 of first planetary gear set 24 through an integral hub plate 38, for example, for common rotation therewith. The third member 34 of the first planetary gear set 24 is continuously connected, for example, by a first sleeve shaft 46, to a first motor/generator assembly 56, interchangeably referred to herein as "motor A". The third member 44 of the second planetary gear set 26 is continuously connected by a second sleeve shaft 48, to a second motor/generator assembly 58, also interchangeably referred to herein as "motor B". The second member 52 (the ring gear) of the third planetary gear set 28 is continuously connected to transmission output member 20 through, for example, an integral hub plate. The first and second sleeve shafts 46, 48 may circumscribe the central shaft 36.

A first torque transfer device 70—which is herein interchangeably referred to as clutch "C1"—selectively connects the first gear member 50 with a stationary member, represented in FIG. 1 by transmission housing 60. The second sleeve shaft 48, and thus gear member 44 and motor/generator 58, is selectively connectable to the first member 50 of the third planetary gear set 28 through the selective engagement of a second torque transfer device 72—which is herein interchangeably referred to as clutch "C2". A third torque transfer device 74—which is herein interchangeably referred to as clutch "C3"—selectively connects the first gear member 40 of the second planetary gear set 26 to the transmission housing 60. The first sleeve shaft 46, and thus third gear member 34 and first motor/generator 56, is also selectively connectable to the first member 40 of the second planetary gear set 26, through the selective engagement of a fourth torque transfer device 76—which is herein interchangeably referred to as clutch "C4".

A fifth torque transfer device 78—which is herein interchangeably referred to as clutch "C5"—selectively connects the input member 18 of engine 12 and the first gear member 30 of the first planetary gear set 24 to the transmission housing 60. Clutch C5 is an input brake clutch, which selectively locks the input member 18 when engine 12 is off. Locking input member 18 provides more reaction for regenerative braking energy. As shown below, in reference to FIG. 2, C5 is not involved in the mode/gear/neutral shifting maneuvers of transmission 14.

The first and second torque transfer devices 70, 72 (C1 and C2) may be referred to as "output clutches." The third and fourth torque transfer devices 74, 76 (C3 and C4) may be referred to as "holding clutches".

In the exemplary embodiment depicted in FIG. 1, the various torque transfer devices 70, 72, 74, 76, 78 (C1-C5) are all friction clutches. However, other conventional clutch configurations may be employed, such as dog clutches, rocker clutches, and others recognizable to those having ordinary skill in the art. The clutches C1-C5 may be hydraulically actuated, receiving pressurized hydraulic fluid from a pump (not shown). Hydraulic actuation of clutches C1-C5 is accomplished, for example, by using a conventional hydraulic fluid control circuit, as will be recognized by one having ordinary skill in the art.

In the exemplary embodiment described herein, wherein the hybrid powertrain 10 is used as a land vehicle, the transmission output shaft 20 is operatively connected to the final drive system (or "driveline"). The driveline may include a front or rear differential, or other torque transfer device, which provides torque output to one or more wheels through respective vehicular axles or half-shafts (not shown). The wheels may be either front or rear wheels of the vehicle on which they are employed, or they may be a drive gear of a track vehicle. Those having ordinary skill in the art will recognize that the final drive system may include any known configuration, including front wheel drive (FWD), rear wheel drive (RWD), four-wheel drive (4WD), or all-wheel drive (AWD), without altering the scope of the claimed invention.

All of the planetary gear sets 24, 26, 28, as well as the first and second motor/generators 56, 58 (motor A and motor B,) are preferably coaxially oriented about the intermediate central shaft 36 or another axis. Motor A or motor B may take on an annular configuration, permitting one or both to generally circumscribe the three planetary gear sets 24, 26, 28. Such a configuration may reduce the overall envelope, i.e., the diametrical and longitudinal dimensions, of the hybrid transmission 14 are minimized.

The hybrid transmission 14 receives input motive torque from a plurality of torque-generative devices. "Torque-generative devices" include the engine 12 and the motors/generators 56, 58 as a result of energy conversion from fuel stored in a fuel tank or electrical potential stored in an electrical energy storage device (neither of which is shown).

The engine 12, motor A (56,) and motor B (58) may operate individually or in concert—in conjunction with the planetary gear sets and selectively-engageable torque-transmitting mechanisms—to rotate the transmission output shaft 20. Moreover, motor A and motor B are preferably configured to selectively operate as both a motor and a generator. For example, motor A and motor B are capable of converting electrical energy to mechanical energy (e.g., during vehicle propulsion), and further capable of converting mechanical energy to electrical energy (e.g., during regenerative braking or during periods of excess power supply from engine 12).

With continuing reference to FIG. 1, an electronic control apparatus (or "controller") having a distributed controller architecture is shown schematically in an exemplary embodiment as a microprocessor-based electronic control unit (ECU) 80. The ECU 80 includes a storage medium with a suitable amount of programmable memory, collectively represented at 82, that is programmed to include, without limitation, an algorithm or method 100 of regulating operation of a multi-mode hybrid transmission, as will be discussed in further detail below with respect to FIG. 4.

The control apparatus is operable, as described hereinafter, to provide coordinated system control of the powertrain 10 schematically depicted and described herein. The constituent elements of the control apparatus may be a subset of an overall vehicle control system. The control system is operable to synthesize pertinent information and inputs, and execute control methods and algorithms to control various actuators to achieve control targets. The control system monitors target and parameters including, without limitation: fuel economy, emissions, performance, driveability, and protection of drivetrain hardware—such as, but not limited to, the engine 12, transmission 14, motor A, motor B, and final drive 16.

The distributed controller architecture (ECU 80) may include a Transmission Control Module (TCM), an Engine Control Module (ECM), a Transmission Power Inverter Module (TPIM), and a Battery Pack Control Module (BPCM). A hybrid control module (HCP) may be integrated to offer overall control and coordination of the aforementioned controllers.

A User Interface (UI) is operatively connected to a plurality of devices (not shown) through which a vehicle operator typically controls or directs operation of the powertrain. Exemplary vehicle operator inputs to the UI include an accelerator pedal, a brake pedal, transmission gear selector, vehicle speed cruise control, and other inputs recognizable to those having ordinary skill in the art.

Each of the aforementioned controllers communicates with other controllers, sensors, actuators, etc., via a local area network (LAN) bus or communication architecture. The LAN bus allows for structured communication of control parameters and commands between the various controllers. The communication protocol utilized is application-specific. For example, and without limitation, one useable communication protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The ECM is operatively connected to, and in communication with, the engine 12. The ECM is configured to acquire data from a variety of sensors and control a variety of actuators of the engine 12 over a plurality of discrete lines. The ECM receives an engine torque command from the HCP, generates a desired axle torque, and an indication of actual engine torque, which is communicated to the HCP. Various other parameters that may be sensed by the ECM include engine coolant temperature, engine input speed to the transmission, manifold pressure, and ambient air temperature and pressure. Various actuators that may be controlled by the ECM include, without limitation, fuel injectors, ignition modules, and throttle control modules.

The TCM is operatively connected to the transmission 14, and functions to acquire data from a variety of sensors and provide command signals to the transmission 14. Inputs from the TCM to the HCP may include estimated clutch torques for each of the clutches C1-C5, and rotational speed of the transmission output shaft 20. Additional actuators and sensors may be used to provide additional information from the TCM to the HCP for control purposes.

Each of the aforementioned controllers may be a general-purpose digital computer, generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, including resident program instructions and calibrations stored in ROM and executed to provide the respective functions of each computer. Information transfer between the various computers may be accomplished using the aforementioned LAN.

In response to operator input, as captured by the UI, the supervisory HCP controller and one or more of the other controllers described above with respect to FIG. 1 determine required transmission output torque. Selectively operated components of the hybrid transmission 14 are appropriately controlled and manipulated to respond to the operator demand. For example, in the embodiment shown in FIG. 1, when the operator has selected a forward drive range and manipulates either the accelerator pedal or the brake pedal, the HCP determines an output torque for the transmission, which affects how and when the vehicle accelerates or decelerates. Final vehicle acceleration is affected by other variables, including such factors as road load, road grade, and vehicle mass. The HCP monitors the parametric states of the torque-generative devices, and determines the output of the transmission required to arrive at the desired torque output. Under the direction of the HCP, the transmission 14 operates over a range of output speeds from slow to fast in order to meet the operator demand.

The ECU 80 also receives frequency signals from sensors for processing into input member 18 speed, $N_i$, and output member 20 speed, $N_o$, for use in the control of transmission 14. The system controller may also receive and process pressure signals from pressure switches (not shown) for monitoring clutch application chamber pressures. Alternatively, pressure transducers for wide range pressure monitoring may be employed. Pulse-width modulation (PWM) and/or binary control signals are transmitted by the controller 80 to transmission 14 for controlling fill and drain of clutches C1-C5 for application and release thereof.

Additionally, the controller 80 may receive transmission fluid sump temperature data, such as from thermocouple inputs (not shown), to derive a sump temperature. Controller 80 may provide PWM signals derived from input speed, $N_i$, and sump temperature for control of line pressure via one or more regulators.

Fill and drain of clutches C1-C5 may be effectuated, for example, by solenoid controlled spool valves responsive to PWM and binary control signals. Trim valves may be employed using variable bleed solenoids to provide precise placement of the spool within the valve body and correspondingly precise control of clutch pressure during apply. Similarly, one or more line pressure regulators (not shown) may be utilized for establishing regulated line pressure in accordance with the PWM signal. Clutch slip speeds across clutches may be derived from, for example: transmission input speed, output speed, motor A speed, and/or motor B speed.

Figures 2, 3:
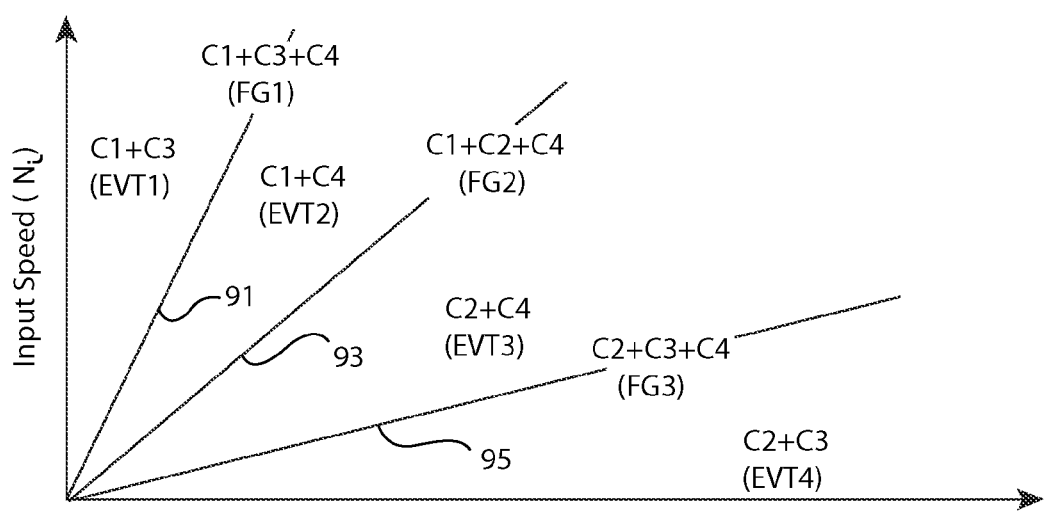
FIG. 2 is a truth table listing the engaged torque-transmitting mechanisms for each of the operating modes of the transmission illustrated in FIG. 1.
FIG. 3 is a graphical representation of various regions of operation with respect to input and output speeds of the transmission illustrated in FIG. 1.

The multi-mode, electrically-variable, hybrid transmission 14 is configured for several transmission operating modes. The truth table provided in FIG. 2 presents an exemplary engagement schedule (also referred to as a shifting schedule) of the torque-transmitting mechanisms C1-C4 to achieve the array of operating states or modes. The various transmission operating modes described in the table indicate which of the specific clutches C1-C4 are engaged (actuated), and which are released (deactivated) for each of the operating modes.

In general, ratio changes in transmission 14 may be performed such that torque disturbances are minimized, and the shifts are smooth and unobjectionable to the vehicle occupants. Additionally, release and application of clutches C1-C4 should be performed in a manner which consumes the least amount of energy, and does not negatively impact durability of the clutches. One major factor affecting these considerations is the torque at the clutch being controlled, which may vary significantly in accordance with such performance demands as acceleration and vehicle loading. Improved shifts may be accomplished by a zero, or close to zero, torque condition at the clutches at the time of application or release, which condition follows substantially zero slip across the clutch. Clutches having zero slip across the clutch may be referred to as operating synchronously.

Electrically-variable operating modes may be separated into four general classes: input-split modes, output-split modes, compound-split modes, and series modes. In an input-split mode, one motor/generator (such as either motor A or motor B) is geared such that its speed varies in direct proportion to the transmission output, and another motor/generator (such as the other of motor A or motor B) is geared such that its speed is a linear combination of the input and output member speeds. In an output-split mode, one motor/generator is geared such that its speed varies in direct proportion to the transmission input member, and the other motor/generator is geared such that its speed is a linear combination of the input member and the output member speeds. A compound-split mode, however, has both motor/generators geared such that their speeds are linear combinations of the input and output member speeds, but neither is in direct proportion to either the speed of the input member or the speed of the output member.

Finally, when operating in a series mode, one motor/generator is geared such that its speed varies in direct proportion to the speed of the transmission input member, and another motor/generator is geared such that its speed varies in direct proportion to the speed of the transmission output member. When operating in series mode, there is no direct mechanical power transmission path between the input and output members and therefore all power must be transmitted electrically.

In each of the four general types of electrically-variable operating modes indicated above, the speeds of the motors are linear combinations of the input and output speeds. Thus, these modes have two speed degrees of freedom (which may be abbreviated for simplicity as "DOF"). Mathematically, the torque (T) and speed (N) equations of this class of modes take the form:

$$\begin{bmatrix} T_a \\ T_b \end{bmatrix} = \begin{bmatrix} a_{1,1} & a_{1,2} \\ a_{2,1} & a_{2,2} \end{bmatrix} \begin{bmatrix} T_i \\ T_o \end{bmatrix} \text{ and } \begin{bmatrix} N_a \\ N_b \end{bmatrix} = \begin{bmatrix} b_{1,1} & b_{1,2} \\ b_{2,1} & b_{2,2} \end{bmatrix} \begin{bmatrix} N_i \\ N_o \end{bmatrix}$$

where a and b are coefficients determined by the transmission gearing. The type of EVT mode can be determined from the structure of the matrix of b coefficients. That is, if $b_{2,1}=b_{1,2}=0$ or $b_{1,1}=b_{2,2}=0$, the mode is a series mode. If $b_{1,1}=0$ or $b_{1,2}=0$, the mode is an input split mode. If $b_{2,1}=0$ or $b_{2,2}=0$, the mode is an output split mode. If each of $b_{1,1}$, $b_{1,2}$, $b_{2,1}$, and $b_{2,2}$ are nonzero, for example, the mode is a compound split mode.

An electrically-variable transmission may also contain one or more fixed-gear (FG) modes. In general, FG modes result from closing (i.e., actuating) one additional clutch than the number required to select an electrically-variable mode. In FG modes, the speed of the input and each motor are proportional to the speed of the output. Thus, these modes have only one speed degree of freedom. Mathematically, the torque and speed equations of this class of modes take the form:

$$[T_b] = \begin{bmatrix} a_{1,1} & a_{1,2} & a_{1,3} \end{bmatrix} \begin{bmatrix} T_a \\ T_i \\ T_o \end{bmatrix} \text{ and } \begin{bmatrix} N_a \\ N_b \\ N_i \end{bmatrix} = \begin{bmatrix} b_{1,1} & b_{1,2} & b_{1,3} \end{bmatrix} [N_o]$$

where a and b are again coefficients determined by the transmission gearing. If $b_{1,1}$ is nonzero, motor A can contribute to output torque during operation in the fixed-gear mode. If $b_{1,2}$ is nonzero, motor B can contribute to output torque during operation in the fixed-gear mode. If $b_{1,3}$ is nonzero, the engine can contribute to output torque during operation in the fixed-gear mode. If $b_{1,3}$ is zero, the mode is an electric-only fixed-gear mode.

An electrically-variable transmission may also be configured for one or more modes with three speed degrees of freedom. These modes may or may not include reaction torque sources such that the transmission is capable of producing output torque proportional to engine torque or motor torque. If a mode with three speed degrees of freedom is capable of producing output torque, the torques of the engine and any motor connected as a reaction to the engine torque will generally be proportional to the output torque. If a motor is not connected as a reaction to the engine torque, its torque can be commanded to control its speed independently of the transmission input and output speed.

In a mode with three speed degrees of freedom, it is generally not possible to easily control battery power independently of output torque. This type of mode produces an output torque which is proportional to each of the reacting torque sources in the system. The fraction of total output power provided by each of the three torque sources may be adjusted by varying the speeds of the motors and input. These modes are hereafter referred to as electric torque converter (ETC) modes in recognition of the fact that power flows to or from the energy storage device as a function of the output torque and the speed of the engine, output, and one of the motors. Mathematically, the torque and speed equations of this class of modes take the form:

$$\begin{bmatrix} T_a \\ T_b \\ T_i \end{bmatrix} = \begin{bmatrix} a_{1,1} & a_{1,2} & a_{1,3} \end{bmatrix} [T_o] \text{ and } [N_b] = \begin{bmatrix} b_{1,1} & b_{1,2} & b_{1,3} \end{bmatrix} \begin{bmatrix} N_a \\ N_i \\ N_o \end{bmatrix}$$

where a and b are coefficients determined by the transmission gearing. If $a_{1,1}$ is nonzero, motor A serves as a reaction member and its torque is proportional to output torque when operating in the ETC mode. If $a_{1,1}$ is zero, motor A is disconnected and its torque is not determined by the output torque. If $a_{1,2}$ is nonzero, motor B serves as a reaction member and its torque is proportional to output torque when operating in the ETC mode. If $a_{1,2}$ is zero, motor B is disconnected and its torque is not determined by the output torque. If $a_{1,3}$ is nonzero, the engine can contribute to output torque during operation in the fixed-gear mode. If $a_{1,3}$ is zero, the input is disconnected and its torque is not determined by the output torque. If all of $a_{1,1}$, $a_{1,2}$, and $a_{1,3}$ are zero, the mode is a neutral mode that is not capable of producing output torque.

There are four neutral modes presented in FIG. 2. In a first neutral mode, N-Full, all clutches are released. N-Full may be utilized when the entire vehicle is stopped and in an off-state, and thus there is no power distribution, electrical, mechanical, or otherwise, being actively distributed throughout the powertrain 10. In N-Full, a 12-volt starting-lighting-and-ignition (SLI) battery may be used for engine start.

In a second neutral mode, N-C3, only clutch C3 is engaged, and motor A and motor B may react engine 12 for start or to charge the energy storage device. Similar to N-C3, when transmission 14 is in N-C4, motor A and motor B may react engine 12 for start or to charge the energy storage device, and clutch C4 as the only engaged torque-transmitting device. In N-C3C4, both the third and fourth clutches C3, C4 are engaged. While transmission 14 is in N-C3C4, motor A is locked or "grounded", and motor B is geared with the engine 12 for engine start.

The first and second planetary gear sets 24, 26 cooperate with the first and second motor/generators 56, 58, along with the selective engagement of the first and second clutches C1, C2, to constitute an electric torque converter (ETC). For example, when the transmission 14 is operating in an ETC mode, the electric output of motor A and/or motor B, depending upon the active control schedule, can be adapted to control the transfer of torque from the engine 12 through the transmission differential gearing to the output member 20. When the vehicle is started, ETC1 Mode is established by engaging the first clutch C1. In ETC1 Mode, motor A reacts engine 12 with the first and third planetary gear sets 24, 28, and motor B freewheels. In ETC1 Mode, the stationary vehicle can be smoothly started with the engine 12 held at a suitable speed by gradually increasing the amount of electric power generated by motor A—i.e., the reaction force of motor A.

There are two other alternative ETC modes available utilizing the transmission configuration presented herein. ETC2 Mode, also known as "compound ETC", can be initiated by engaging clutch C2, and disengaging the remaining clutches. In ETC2 Mode, motor A reacts engine 12 with the first and third planetary gear sets 24, 28, while motor B reacts engine 12 and motor A to the output member 20. The distribution of engine torque is manipulated through the cooperative management of the amount of electric power output generated by motor A and motor B.

The third ETC mode, ETC12 Mode, can be initiated by engaging both clutch C1 and clutch C2. Similar to ETC1 Mode, motor A reacts the engine 12 with the first and third planetary gear sets 24, 28. However, in this instance, motor B is grounded to the transmission housing 60. In ETC12 Mode, the vehicle can be smoothly accelerated with the engine 12 held at a suitable speed by gradually increasing the reaction force generated by motor A; which may be proportional to the electric power generated by motor A.

When the engine 12 is in an off-state, the transmission 14 can utilize the ETC mode clutch control schedule to vary the amount of electric energy generated by motor A so as to gradually increase the drive torque of motor A and/or motor B. For example, if the transmission 14 is shifted into ETC1 Mode when the engine 12 is in an off-state, the engine 12 will create a reaction force, by way of input member 18. The motive output of the motor A can then be controlled, and a continuous and uninterrupted transmission output torque maintained, without having to turn the engine 12 on.

The exemplary powertrain 10 described herein has three fixed-gear (FG), or "direct," modes of operation. In all fixed-gear modes of this embodiment of transmission 14, the vehicle is driven in the forward direction by operation of the engine 12. The selective engagement of clutches C1, C3 and C4 shifts the transmission 14 into FG1 Mode. In FG1, motor A is grounded, and the engine drives the first planetary gear set 24 to the third planetary gear set 28 and, thus, the output member 20. FG2 Mode is achieved by the selective engagement of clutches C1, C2 and C4. In FG2, motor B is grounded, and the engine drives the first and second planetary gear sets 24, 26 to the third planetary gear set 28 and, thus, the output member 20. Likewise, FG3 Mode is achieved by the selective engagement of clutches C2, C3 and C4. In FG3, motor A is locked, and the engine drives the first planetary gear set 24 to the second and third planetary gear sets 26, 28 and the output member 20. When operating in a fixed-gear mode of operation, the output member speed $N_o$ is directly proportional to input member speed $N_i$ and the selected gear ratio. $N_i = N_o \times GR$.

With continued reference to FIG. 2, the transmission 14 may also operate in four electrically-variable transmission (EVT) modes. In EVT1 and EVT4, the transmission 14 is operating in an input-split mode of operation, wherein the output speed $N_o$ of the transmission 14 is proportional to the speed of one motor/generator 56, 58 (motor A or motor B). Specifically, EVT1 Mode is achieved through the selective engagement of the first and third clutches C1 and C3. When in EVT1, motor A functions to react the engine 12 with the first planetary gear set 24, to the third planetary gear set 28, and the output member 20; while motor B drives the second and third planetary gear sets 26, 28. Motor A propels the vehicle in EVT1. Alternatively, the transmission 14 may be selectively shifted into EVT4 Mode by actuating clutch C2 and clutch C3. In EVT4, motor A functions to react the engine 12 with the first planetary gear set 24, to the second and third planetary gear sets 26, 28, and the output member 20, while motor B drives the second and third planetary gear sets 26, 28. Motor B propels the vehicle in EVT4.

In EVT2 and EVT3, the transmission 14 is operating in a compound-split mode, wherein the output speed $N_o$ of the transmission 14 is not proportional to the speed of a single motor/generator, but is rather an algebraic linear combination of the speeds of both motor/generators. More particularly, EVT2 is achieved through the selective engagement of the first and fourth clutches C1, C4. In this mode, motor A and motor B operate to react the engine 12 with the first and second planetary gears sets. Alternatively, the transmission 14 may be selectively shifted into EVT3 Mode by actuating clutch C2 and clutch C4. When operating in EVT3 Mode, the two motor/generator assemblies 56, 58 react the engine 12 with all three planetary gear sets 24, 26, 28.

With reference to FIG. 3, a plot of transmission output speed, $N_o$, along the horizontal axis versus input speed, $N_i$, across the vertical axis is illustrated. FIG. 3 is only a graphical representation of exemplary regions of operation for each operating mode with respect to input and output speeds of this embodiment of transmission 14.

Synchronous operation in FG1—the input speed and output speed relationships where clutches C1, C3 and C4 are operating with substantially zero slip speed thereacross—is represented by line 91. As such, line 91 represents an input and output speed relationship at which substantially synchronous shifting between EVT modes can occur. FG1 is also a range at which direct mechanical coupling from input to output can be effected by simultaneous application of clutches C1, C3 and C4—i.e., fixed- or direct-ratio.

Synchronous operation in FG2—the input speed and output speed relationships where clutches C1, C2 and C4 are operating with substantially zero slip speed thereacross—is represented by line 93. Similarly, the relationships between input and output speed during operation in FG3, whereat clutches C2, C3 and C4 are operating simultaneously with substantially zero slip speed thereacross, is represented by line 95.

To the left of the shift ratio line 91 is an exemplary region of operation for the first EVT mode, EVT1, wherein both C1 and C3 are applied, and C2 and C4 are released. To the right of the shift ratio line 91 and left of shift ratio line 93 is an exemplary region of operation for the second EVT mode, EVT2, wherein C1 and C4 are applied, and C2 and C3 are released.

To the right of shift line 93 and left of shift ratio line 95 is an exemplary region of operation for the third EVT mode, EVT3, wherein both C2 and C4 are applied, and C1 and C3 are released. To the right of the shift ratio line 95 is an exemplary region of operation for the fourth EVT mode, EVT4, wherein C2 and C3 are applied, and C1 and C4 are released. As used herein with respect to clutches C1-C5, the terms "applied" or "actuated" indicate substantial torque transfer capacity across the respective clutch. Antithetically, the terms "released" or "deactivated" indicate insubstantial or no torque transfer capacity across the respective clutch.

While the regions of operation specified above may be generally favored for operation of the hybrid transmission 14, it is not meant to imply that the various EVT regions of operation depicted in FIG. 3 cannot or do not overlap. Generally, however, it may be preferred to operate in the specified regions because each particular mode of operation preferably employs gear sets and motor hardware particularly well suited in various aspects (e.g., mass, size, cost, inertial capabilities, etc.) for that region. Similarly, while the individual regions of operation specified above are generally preferred for the particular modes of operation indicated, it is not meant to imply that the regions of operation for the individual EVT modes cannot be switched.

Generally, a shift into Mode 1 may be considered a downshift and is associated with a higher gear ratio in accordance with the relationship of $N_i/N_o$. In contrast, a shift into Mode 4 is considered an upshift, and is associated with a lower gear ratio in accordance with the relationship of $N_i/N_o$. As discussed herein, other mode-to-mode shift sequences are feasible. For example, a shift from EVT1 to EVT3 is also an upshift, while a shift from EVT4 to EVT2 is considered a downshift.

Figure 4:
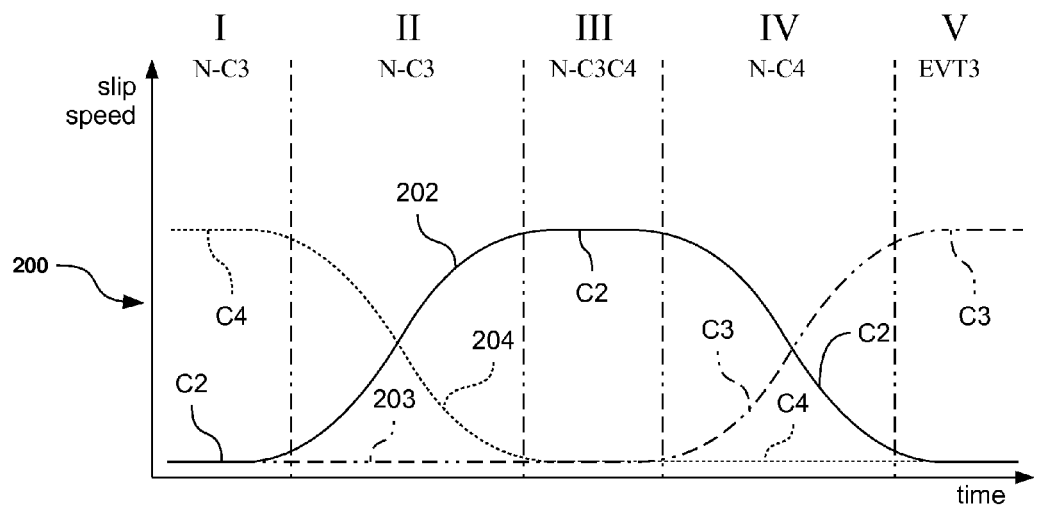
FIG. 4 is a schematic illustration of clutch slip speeds during a neutral mode shift engaging multiple holding clutches.
Figure 5:
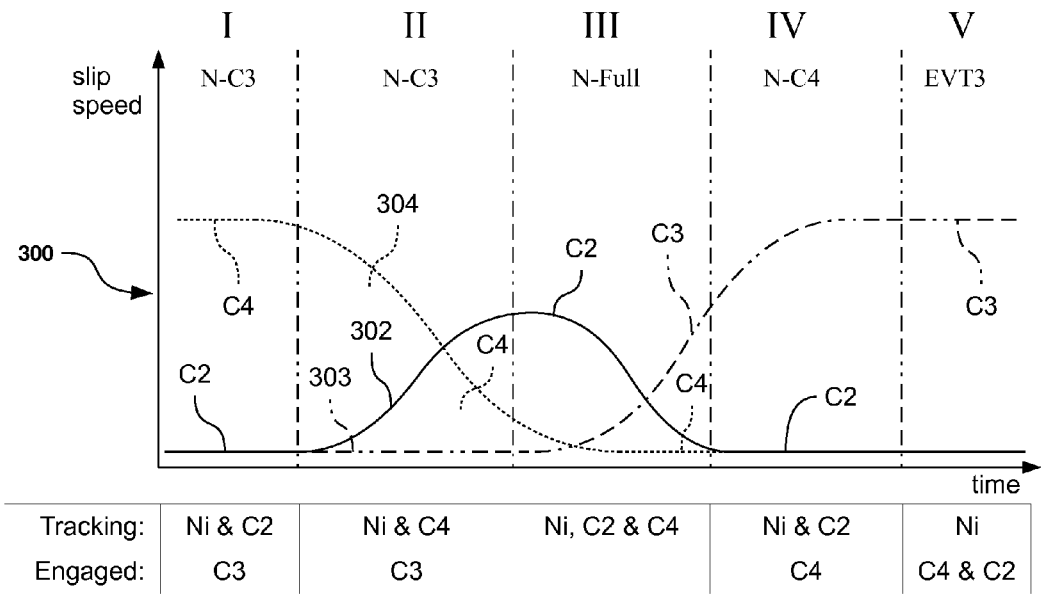
FIG. 5 is a schematic illustration of clutch slip speeds during a neutral mode shift through full hydraulic neutral.
Figure 6:
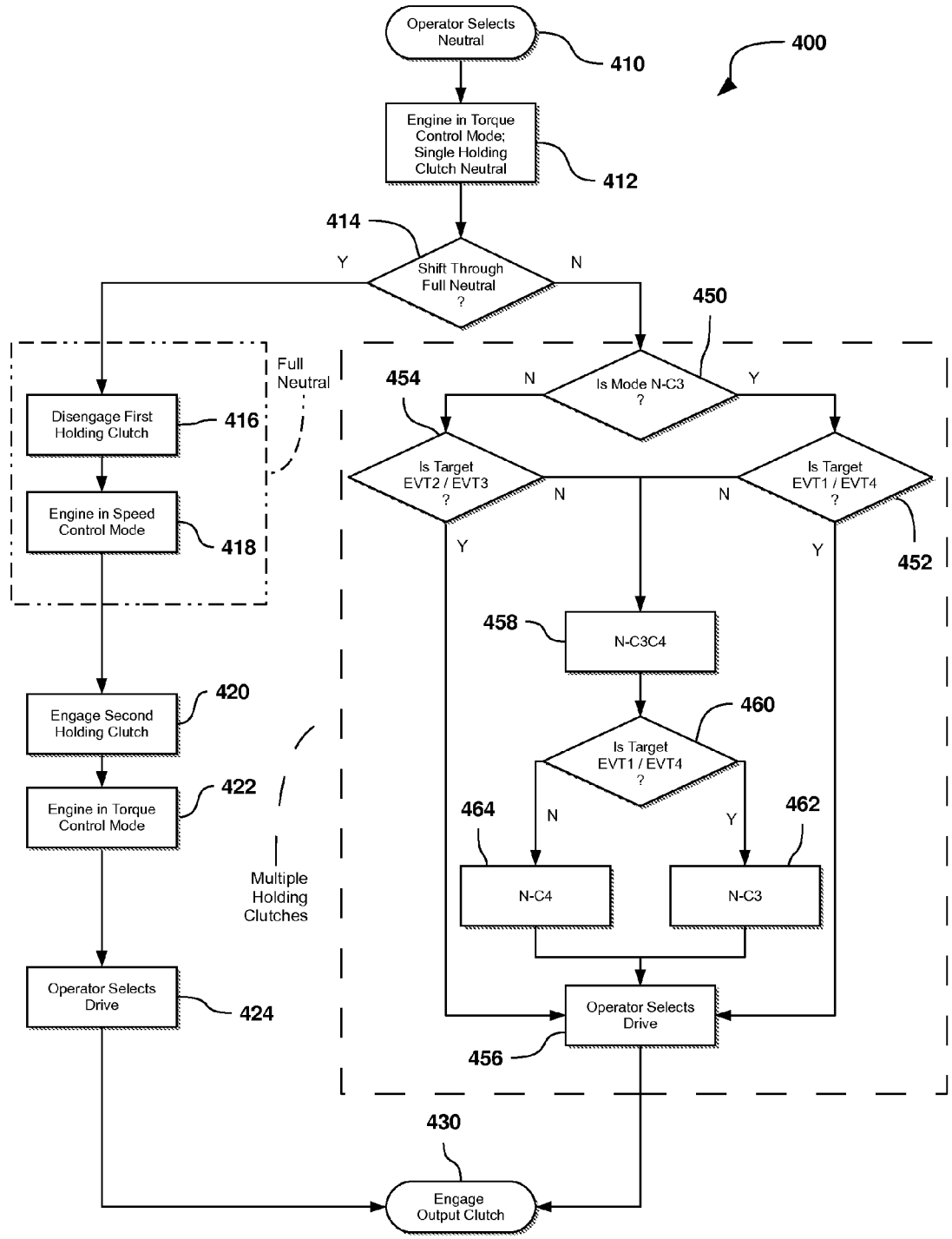
FIG. 6 is a schematic flow chart of an algorithm for executing the method for controlling neutral modes in the hybrid transmission.

Referring now to FIGS. 4, 5 and 6, and with continued reference to FIGS. 1-3, there are shown two schematic clutch control schemes for shifting between neutral modes and an algorithm for controlling neutral mode transitions. On the transmission 14, it is possible that true neutral modes—modes in which no output torque is transferred to final drive system 16—can be established with no clutches engaged, one clutch engaged, or two clutches engaged. Full hydraulic neutral, referred to herein as N-Full, is established when no clutches are engaged.

When the system is in any true neutral mode, it may be desirable to perform a garage shift quickly with minimal delay. As used herein, the term "garage shifts" encompasses shifts at or near zero output speed, including shifts from neutral and shifts between forward and reverse directions (e.g. direction changing shifts). The operator of the vehicle may be able to designate a general operating mode for the vehicle by selecting one of the options with a gear shift lever or gear stick. These general modes may be designated as: P, R, N, D, and M; where, for example, "P" is park, "R" is reverse, "N" is neutral, "D" is drive, and "M" is manual. Alternatively, the whole words may be shown on a display for the vehicle operator.

Depending on the system states, such as vehicle speed, speed of engine 12 or operator torque request, the garage shift may be requested to go to one of the EVT modes. As shown in FIG. 2, each of the EVT modes require one holding clutch (either C3 or C4) and one output clutch (either C1 or C2) to be engaged. Different EVT modes are selected with different output and holding clutch combinations.

Selection of EVT1 requires actuation of clutches C3 and C1 and selection of EVT4 requires actuation of C3 and C2. Therefore, in order to quickly engage EVT1 or EVT4 after the garage shift is requested, the HCP may place the transmission in N-C3. Selection of EVT2 requires actuation of clutches C4 and C1 and selection of EVT3 requires actuation of C4 and C2. Therefore, in order to quickly engage either EVT2 or EVT3 after the garage shift is requested, the HCP may place the transmission in N-C4.

The hybrid control module (HCP) performs clutch state transfer between single-clutch neutral modes with the best knowledge of what the most likely or predicted EVT mode will be when the garage shift is requested and completed. There are two methods of executing shifts from one single-clutch neutral mode to another: shifting through full hydraulic neutral (N-Full), and shifting through multiple holding clutches (N-C3C4).

FIG. 4 shows a control scheme 200 of clutch slip speeds during the single-clutch neutral mode shift while engaging multiple holding clutches and transferring through N-C3C4. FIG. 5 shows a control scheme 300 of clutch slip speeds during the single-clutch neutral mode shift passing through full hydraulic neutral, N-Full. FIG. 6 shows a schematic flow chart of an algorithm 400 for executing a method for controlling neutral mode shift in the transmission 14. The FIGS. 4-6 are illustrative of possible control schemes for the transmission 14, but are not intended to limit the scope of the invention as embodied in the appended claims.

FIG. 4 shows the transmission 14 beginning in N-C3 in zone I of control scheme 200. The illustrative slip speed of clutch C2 is shown on line 202, the slip speed of C3 is shown on line 203, and the slip speed of C4 on line 204. In this zone the HCP is expecting or predicting that the next requested EVT mode will be EVT4. Clutch C3 is engaged and the HCP is shown tracking C2, which would allow the transmission 14 to quickly be placed in EVT4 if requested.

As used herein, "tracking" refers to controlling the speed of the tracked component within the transmission 14. For example, tracking C1 includes synchronizing the clutch C1 to zero slip speed. Depending upon the clutch, and the relative rotational speeds of the elements locked/unlocked by the clutch, tracking may involve increasing speed, decreasing speed, or stopping rotation of one or more elements.

Tracking C1 may be followed by pressurizing the C1 clutch cylinder to quickly effect synchronous engagement of C1. A fully engaged clutch does not need to be tracked, because the slip speed of the engaged clutch is, ideally, zero. Tracking input speed ($N_i$), includes controlling the speed of engine 12, such that $N_i$ does not drop below a minimum idle speed and is able to maintain the correct speed ratio for the transmission 14 to prepare for smooth or desirable operation of the vehicle.

On the multi-mode hybrid transmission 14, the system has 4 degrees of freedom (DOF) in speed: output speed, $N_o$; input speed, $N_i$; and the speeds of the two electric machines, $N_A$ and $N_B$. Because the output speed, $N_o$, cannot be directly controlled (there is no control over the final drive system 16 from within powertrain 10), neutral tracking may be accomplished with three components: the engine 12, motor A, and motor B. "Neutral tracking," as referred to herein, is the ability to control the input speed ($N_i$) to the desired optimal speed, and to synchronize the holding and output clutches ($N_{Cx}$, $N_{Cy}$), in preparation for engagement of an EVT mode. Therefore, three components, at most, may be tracked at one time.

Because one of the holding clutches is engaged while in the single-clutch neutral modes, only two components need to be controlled for neutral tracking, the input speed, $N_i$, and the speed of the expected output clutch, $N_{Cx}$. When the transmission 14 is in either of the single-clutch neutral modes (N-C3 or N-C4) and the engine 12 is in torque control mode, the motors A and B are available to control the speed of two components. Therefore, motor A and motor B may be used track the input speed, $N_i$, and the speed of one of the disengaged clutches, $N_{Cx}$.

While the transmission 14 is in full hydraulic mode, N-Full, there are 4 degrees of freedom and the system is incapable of performing neutral tracking with motor A and motor B alone. Therefore, the engine 12 must be commanded into a speed control mode, such that it can track (e.g. control) its own speed without reaction torque from motor A or motor B. Alternatively, the HCP may effect speed control of the engine 12 with a torque command combined with a closed-loop adjustment from a measurement of the actual resulting speed of engine 12 (resulting in speed control over the engine 12 by looping adjustments of the torque command).

Referring again to FIG. 4, in zone I the transmission 14 is in N-C3 and the ECM controls engine 12 in torque control mode. The motors A and B are tracking $N_i$ and C2. As control scheme 200 moves from zone I to zone II, the HCP changes its prediction of the next requested mode from EVT4 to EVT3. Therefore, N-C4 will be the preferred single-clutch neutral mode and holding clutch C4 will need to be engaged in order to quickly engage EVT3. In zone II, the HCP begins tracking C4 instead of tracking C2; this brings the slip speed of C4 toward zero.

As control scheme 200 moves from zone II to zone III, the slip speed of C4 nears zero, and the HCP commands engagement of C4. Engagement of C4, in addition to the continued engagement of C3, places the transmission 14 in N-C3C4. While in N-C3C4, both of the holding clutches are engaged, and the only component which may be tracked is the input speed, $N_i$, which is tracked by motors A and B. Furthermore, note that while in N-C3C4, the transmission may be quickly placed into either FG1 or FG3 through engagement of clutch C1 or C2, respectively.

As control scheme 200 moves to zone IV, clutch C3 is disengaged, providing another degree of freedom. Motors A and B begin tracking C2 and moving the slip speed of C2 toward zero, in preparation for engagement of C2 and selection of EVT3 as the predicted mode following a garage shift in which the driver/operator selects "Drive". Zone V shows the transition out of neutral modes into the predicted EVT mode, in this case EVT3 is selected by engagement of C2. The engine 12 stayed in torque control throughout the transition from N-C3 to N-C4, therefore producing minimum disturbance to the system.

As shown in FIG. 5, transition between neutral modes, and specifically between single-clutch neutral modes, may also occur via full hydraulic neutral, N-Full. The illustrative slip speed of clutch C2 is shown on line 302, the slip speed of C3 is shown on line 303, and the slip speed of C4 on line 304. As the control scheme 300 changes the predicted upcoming EVT mode from EVT4 to EVT3, the HCP stops tracking C2 and begins tracking C4, as shown in zones I and II.

After the slip speed of clutch C4 nears zero, the control schemed 300 disengages C3. Disengagement of the holding clutch C3 places transmission 14 in N-Full, as shown in zone III.

While the transmission is in full hydraulic neutral mode, N-Full, there are 4 degrees of freedom and the system is incapable of performing neutral tracking with motor A and motor B alone. Therefore, the engine 12 must be commanded into speed control mode, such that it can track (e.g. control) its own speed. The engine 12 is commanded to speed control mode by the ECM as clutch C3 is being offloaded, and engine 12 begins tracking $N_i$ before C3 is completely exhausted. As shown in zone III, motors A and B continue tracking C4 and begin tracking C2. Control scheme 300 therefore synchronizes both the on-coming holding clutch (C4) and the desired output clutch (C2) at the same time, which may result in shorter shift transition.

As control scheme 300 enters zone IV, the engine 12 is returned to torque control mode as clutch C4 is filled and engaged. Engagement of C4 allows the motors A and B to begin tracking Ni by providing reaction torque, which allows the engine 12 to be returned to torque control mode. Motors A and B also begin tracking C2 in zone IV.

Dynamically commanding the engine 12 between torque control and speed control mode when the system is going into or coming out of the full hydraulic neutral mode, allows the HCP to balance all inputs to the powertrain 10. Once engine 12 returns to torque control mode and motors A and B bring the slip speed of C2 near zero, the transmission 14 is ready for the garage shift and EVT3 may be quickly engaged upon request by the driver. Those having ordinary skill in the art will recognize that, while both control schemes 200 and 300 are plotted with respect to time, FIGS. 4 and 5 are illustrative only and may not be drawn to scale with respect to time or slip speed.

The HCP system control algorithm will perform both types of shift maneuver, utilizing either control scheme 200 or 300, depending on the system performance requirements. The control scheme 200 may accomplish the transition between neutral modes in a relatively smoother fashion than control scheme 300. However, control scheme 300 may accomplish the transition between neutral modes in relatively less time than control scheme 200. The availability of dual control schemes yields added flexibility and responsiveness of either a relatively quick or relatively smooth transition during varied driving conditions.

Referring now to FIG. 6, and with continued reference to FIGS. 1-5, there is shown a flow chart of an algorithm 400 usable for executing the method for control neutral mode transitions. Much of the algorithm 400 may be utilized with the structure and control strategies illustrated in FIGS. 1-5, preferably executed as algorithms in the controllers of the control system described above, to control operation of the system described with reference to figures. However, those having ordinary skill in the art will recognize that the algorithm 400 may also be incorporated into other powertrain arrangements and control schemes without departing from the intended scope of the claimed invention.

Algorithm 400 begins when the operator of the vehicle has selected neutral as the general vehicle drive mode, often designated by "N" or "Neutral," at step 410. The algorithm 400 constantly monitors vehicle and powertrain operating conditions. In step 412, the engine 12 is placed in torque control mode and a first holding clutch (C3 or C4) is engaged to place transmission 14 in single-clutch neutral mode. Based upon either driver demands or vehicle conditions, the HCP may determine that a shift or transition between neutral modes is advantageous.

In step 414, the algorithm 400 determines whether a shift through full hydraulic neutral, N-Full, is preferred over a shift through multiple holding clutches, N-C3C4. If the transition is better executed through N-Full, the algorithm 400 proceeds from step 414 to step 416 and disengages the holding clutch. Once both holding clutches are disengaged, the transmission is in full hydraulic neutral mode.

In step 418, the algorithm 400 places the engine 12 in speed control mode. Steps 416 and 418 may occur substantially contemporaneously with each other, in order to minimize torque disturbances to the transmission 14. Furthermore the algorithm 400 may be tracking the other holding clutch (a second holding clutch) during steps 416 and 418.

In step 420, the algorithm 400 engages the second holding clutch which would have been synchronized due to tracking by motors A and B. In step 422, the engine is returned to torque control mode, completing the transition out of N-Full and back into one of the single-clutch neutral modes. Steps 420 and 422 may occur substantially contemporaneously with each other, in order to minimize torque disturbances to the transmission 14.

While the transmission 14 was in N-Full, the algorithm 400 may also have begun tracking one of the output clutches (C1 or C2), depending upon the expected EVT mode when the operator executes the garage shift. In step 424, the operator selects the "Drive" operating mode, and algorithm 400 completes synchronization of the output clutch (unless the output clutch has already been synchronized). In step 430, the algorithm 400 completes the garage shift by engaging the output clutch and placing the transmission 14 into the preferred EVT mode.

If the transition is better executed through engagement of multiple holding clutches, N-C3C4, the algorithm 400 proceeds from step 414 to step 450. The algorithm 400 determines into which of the single-clutch neutral modes the transmission 14 has been placed. If the mode is N-C3, the algorithm 400 proceeds to step 452. If the mode is N-C4, the algorithm 400 proceeds to step 454.

As described above, N-C3 is the preferred neutral mode for subsequent selection of either EVT1 or EVT4. Therefore, step 452 determines whether EVT1 or EVT4 is the target mode following the garage shift, such that the transmission is already in the preferred single-clutch neutral mode. If step 452 determines that EVT1 or EVT4 is the target mode, the algorithm moves to step 456 and awaits operator initiation of the garage shift via selection of "D" or "Drive." As before, once the garage shift is executed, the output clutch is engaged and the preferred EVT mode is selected at step 430.

Similarly, N-C4 is the preferred neutral mode for subsequent selection of either EVT2 or EVT3. Therefore, step 454 determines whether EVT2 or EVT3 is the target mode following the garage shift, such that the transmission is already in the preferred single-clutch neutral mode. If step 454 determines that EVT2 or EVT3 is the target mode, the algorithm moves to step 456 and awaits operator initiation of the garage shift via selection of "D" or "Drive." Following the garage shift, the output clutch is engaged and the preferred EVT mode is selected at step 430.

During or after steps 452 and 454, the algorithm 400 may also use the motors A and B to begin tracking the specific output clutch which will be engaged in step 430. Tracking by motors A and B will move the slip speed of the desired output clutch toward zero and ready that clutch for synchronous engagement.

However, if either of steps 452 or 454 determines that the transmission 14 is not in the preferred neutral mode—because N-C3 is selected but EVT2 or EVT3 is predicted, or because N-C3 is selected but EVT1 or EVT4 is predicted—the algorithm 400 will move to step 458. When the transmission 14 needs to transfer from one single-clutch neutral mode to the other, step 458 causes the transmission to select the multiple holding clutch mode, N-C3C4. In order to smoothly select N-C3C4, motors A and B are used to track and synchronize whichever of the holding clutches (C3 or C4) is not already engaged.

From N-C3C4, the transmission may select either of the single-clutch neutral modes. Step 460 determines whether the predicted mode is EVT1 or EVT4, which would require disengagement of C4 to place the transmission 14 in N-C3, the algorithm proceeds to step 462. If step 460 determines that the predicted mode is EVT2 or EVT3, the algorithm will proceed to step 464, for causing disengagement of C3 and placing the transmission 14 in N-C4.

Following steps 462 and 464, the transmission 14 is ready to quickly be placed into the preferred, predicted EVT mode upon selection of "Drive" by the operator in step 456. After the operator initiates the garage shift (and after motors A and B track and synchronize the desired output clutch) the output clutch is engaged and the preferred EVT mode is selected at step 430. The transition shift through N-C3C4, in steps 450-430, is executed without taking the engine 12 out of torque control mode.

While the best modes and other modes for carrying out the present invention have been described in detail, those familiar with the art to which this invention pertains will recognize various alternative designs and embodiments for practicing the invention within the scope of the appended claims.

The invention claimed is:

1. A method of hydraulic clutch control for a vehicle having a multi-mode hybrid transmission having first and second holding clutches and first and second output clutches, comprising:

engaging the first holding clutch to place the transmission in a first neutral mode;

predicting a first electronically variable transmission (EVT) mode;

beginning tracking of the first output clutch;

predicting a second EVT mode;

ending tracking of the first output clutch;

beginning tracking of the second holding clutch;

engaging the second holding clutch to place the transmission in a second neutral mode, wherein engaging the second holding clutch ends tracking of the second holding clutch;

disengaging the first holding clutch to place the transmission in a third neutral mode;

beginning tracking of the second output clutch; and engaging the second output clutch to place the transmission in the second EVT mode, wherein engaging the second output clutch ends tracking of the second output clutch.

2. The method of claim 1, wherein the transmission is operatively connected to an internal combustion engine, further comprising placing the engine in a torque control mode while the transmission is in the first neutral mode.

3. The method of claim 2, further comprising placing the engine in the torque control mode while the transmission is in the second neutral mode and while the transmission is in the third neutral mode.

4. The method of claim 3, wherein predicting the first and second EVT modes includes monitoring one of a vehicle speed, an engine speed and a driver torque request.

5. A method of hydraulic clutch control for a multi-mode hybrid transmission having first and second holding clutches and first and second output clutches, wherein the transmission is coupled to an internal combustion engine, the method comprising:

placing the engine in a torque control mode;

engaging the first holding clutch to place the transmission in a first neutral mode;

beginning tracking of the second holding clutch;

beginning disengagement of the first holding clutch;

placing the engine in a speed control mode; and completing disengagement of the first holding clutch to place the transmission in a full hydraulic neutral mode, wherein none of the clutches are engaged during full hydraulic neutral mode.

6. The method of claim 5, further comprising beginning tracking of the second output clutch while continuing to track the second holding clutch.

7. The method of claim 6, further comprising:

beginning engagement of the second holding clutch;

placing the engine in a torque control mode; and completing engagement of the second holding clutch to place the transmission in a second neutral mode.

8. The method of claim 7, further comprising engaging the second output clutch to place the transmission a first EVT mode, wherein engaging the second output clutch ends tracking of the second output clutch.

* * * * *